US008297448B2

(12) United States Patent
Watson

(10) Patent No.: US 8,297,448 B2
(45) Date of Patent: Oct. 30, 2012

(54) SCREEN INTAKE DEVICE FOR SHALLOW WATER

(75) Inventor: Mark Watson, Sturbridge, MA (US)

(73) Assignee: Johnson Screens, Inc., Houston, TX (US)

( * ) Notice: Subject to any disclaimer, the term of this patent is extended or adjusted under 35 U.S.C. 154(b) by 33 days.

(21) Appl. No.: 12/951,217

(22) Filed: Nov. 22, 2010

(65) Prior Publication Data

US 2012/0125828 A1 May 24, 2012

(51) Int. Cl.
*B01D 35/02* (2006.01)
(52) U.S. Cl. .............. 210/460; 210/170.09; 210/170.11; 210/172.3; 210/456; 210/499
(58) Field of Classification Search .................. None
See application file for complete search history.

(56) References Cited

U.S. PATENT DOCUMENTS

| 154,158 | A | * | 8/1874  | Spooner ........... 210/242.1 |
| 423,129 | A | * | 3/1890  | Clark ................ 137/150 |
| 539,800 | A | * | 5/1895  | Durant ............. 210/460 |
| 615,847 | A | * | 12/1898 | Hansen ............. 210/460 |
| 704,012 | A | * | 7/1902  | Emerson ........... 210/460 |
| 705,364 | A | * | 7/1902  | Kurtz .............. 210/170.01 |
| 756,517 | A | * | 4/1904  | Miller .............. 137/140 |
| 785,125 | A | * | 3/1905  | Shafer ............. 210/241 |
| 857,519 | A | * | 6/1907  | Foster ............. 210/460 |
| 866,560 | A | * | 9/1907  | Basye ............. 166/231 |
| 882,098 | A | * | 3/1908  | Chial .............. 137/342 |
| 894,339 | A | * | 7/1908  | Niemeier .......... 405/127 |
| 901,733 | A | * | 10/1908 | O'Sullivan ........ 169/91 |
| 1,033,745 | A | * | 7/1912  | Smith ............. 210/107 |
| 1,116,234 | A | * | 11/1914 | Brown ............. 210/460 |
| 1,209,800 | A | * | 12/1916 | Barber ............. 137/236.1 |
| 1,230,971 | A | * | 6/1917  | Wilson ............. 137/150 |
| 1,274,121 | A | * | 7/1918  | White ............. 210/456 |
| 1,315,615 | A | * | 9/1919  | Wahlman .......... 405/127 |
| 1,579,917 | A | * | 4/1926  | Deming ........... 210/242.1 |
| 1,694,743 | A | * | 12/1928 | Hinman ........... 210/460 |
| 1,905,919 | A | * | 4/1933  | Kent ............... 210/460 |
| 1,945,824 | A | * | 2/1934  | Saxe .............. 210/460 |
| 1,967,785 | A | * | 7/1934  | Schacht ........... 210/463 |
| 2,249,020 | A | * | 7/1941  | McFarlin .......... 210/460 |

(Continued)

OTHER PUBLICATIONS

Johnson Screens, Brochure, "Passive Intake Screen Systems," obtained from http://www.johnsonscreens.com, undated.

(Continued)

*Primary Examiner* — Robert James Popovics
(74) *Attorney, Agent, or Firm* — Wong, Cabello, Lutsch, Rutherford & Brucculeri, LLP

(57) ABSTRACT

A screen intake apparatus has a concrete platform resting on a water source floor. A screen intake anchors on the platform and forms a half cylinder thereon. A barrier at one end of the platform in divides the flow of water. The screen intake has a half-cylindrical body and half-cylindrical screens. Transition walls in the screen intake divide the body's hollow and the screens' interiors, and at least one flow modifier communicates the interior with the hollow. These flow modifiers also form a half cylinder with the platform. A manifold in the screens receives a supply of air to clear debris. Forming a half-cylinder, the screen intake on the platform can have a much lower profile for the water source than the normal cylindrical screens, which require half of its diameter in clearance above and below.

14 Claims, 5 Drawing Sheets

U.S. PATENT DOCUMENTS

| | | | | |
|---|---|---|---|---|
| 2,270,116 A * | 1/1942 | Featherston et al. | ......... | 210/460 |
| 2,300,952 A * | 11/1942 | May | ............... | 210/456 |
| 2,371,895 A * | 3/1945 | Kingman | ................. | 210/457 |
| 2,374,756 A * | 5/1945 | Kisch et al. | .................. | 210/460 |
| 2,490,443 A * | 12/1949 | Knipper | ................ | 210/315 |
| 2,503,455 A * | 4/1950 | Sheren | ................. | 210/318 |
| 2,512,877 A * | 6/1950 | Rike | ............... | 210/172.2 |
| 2,572,173 A * | 10/1951 | McFarlin | ................ | 210/460 |
| 2,580,209 A * | 12/1951 | Wiley | ............... | 210/460 |
| 2,597,728 A * | 5/1952 | Hink | .................. | 210/119 |
| 2,754,003 A * | 7/1956 | Fenner | ................. | 210/134 |
| 2,877,903 A * | 3/1959 | Veres | ................. | 210/462 |
| 2,886,181 A * | 5/1959 | Wiedorn | ................ | 210/460 |
| 2,957,579 A * | 10/1960 | McCombie | ............... | 210/242.1 |
| 3,037,636 A * | 6/1962 | McFarlin | ................. | 210/429 |
| 3,109,812 A * | 11/1963 | McAulay et al. | ......... | 210/242.1 |
| 3,117,584 A * | 1/1964 | Elenbaas | ............. | 134/168 R |
| 3,163,229 A * | 12/1964 | Salisbury | ................. | 166/234 |
| 3,206,036 A * | 9/1965 | Hawley | ................. | 210/460 |
| 3,291,313 A * | 12/1966 | Davis | ................ | 210/354 |
| 3,323,536 A * | 6/1967 | O'Connor et al. | ........... | 137/140 |
| 3,495,714 A * | 2/1970 | Barton | ................. | 210/460 |
| 3,613,894 A * | 10/1971 | Clegg, Jr. | ................... | 210/276 |
| 3,643,802 A * | 2/1972 | Jackson, Jr. | ................ | 210/172.3 |
| 3,722,686 A * | 3/1973 | Arnett et al. | .............. | 210/170.09 |
| 3,782,552 A * | 1/1974 | Wendell | ................ | 210/242.1 |
| 3,783,888 A * | 1/1974 | Johnson | ................. | 137/145 |
| 3,927,534 A * | 12/1975 | Larson et al. | ................ | 405/127 |
| 4,017,394 A * | 4/1977 | Hensley | .................. | 210/157 |
| 4,152,264 A * | 5/1979 | Hanna, Sr. | .............. | 210/170.09 |
| 4,169,792 A * | 10/1979 | Dovel | ................ | 210/793 |
| 4,179,379 A * | 12/1979 | Mitchell | ............... | 210/242.1 |
| 4,210,539 A * | 7/1980 | Shiban | ................. | 210/391 |
| 4,357,238 A * | 11/1982 | Ziaylek, Jr. | ................. | 210/232 |
| 4,437,431 A * | 3/1984 | Koch | ............... | 405/83 |
| 4,594,024 A * | 6/1986 | Jenkner et al. | ................ | 405/127 |
| 4,647,374 A * | 3/1987 | Ziaylek et al. | ................. | 210/242.1 |
| 4,822,486 A * | 4/1989 | Wilkins et al. | ........... | 210/170.09 |
| 4,834,138 A * | 5/1989 | Dellasso | ................ | 137/590 |
| 4,973,403 A * | 11/1990 | Kozey | .................. | 210/170.09 |
| 4,973,405 A * | 11/1990 | Kozey | .................. | 210/238 |
| 4,998,847 A * | 3/1991 | Thurber | ................ | 405/127 |
| 5,082,013 A * | 1/1992 | Scheib | .................. | 137/1 |
| 5,094,751 A * | 3/1992 | Ramsey et al. | .............. | 210/409 |
| D327,693 S * | 7/1992 | Berry | ..................... | D15/141 |
| 5,161,913 A * | 11/1992 | Boylan | ................. | 405/83 |
| 5,215,656 A * | 6/1993 | Stoneburner | ............. | 210/170.09 |
| 5,269,338 A * | 12/1993 | Figas | ................ | 137/140 |
| 5,431,816 A * | 7/1995 | Aldred et al. | ............... | 210/460 |
| 5,496,468 A * | 3/1996 | Cormier | .................... | 210/172.3 |
| 5,509,437 A * | 4/1996 | Merrett | ................... | 137/15.02 |
| 5,581,934 A * | 12/1996 | Arnold, Sr. | ................ | 43/64 |
| 5,650,073 A * | 7/1997 | Merrett | ..................... | 210/747.5 |
| 5,759,398 A * | 6/1998 | Kielbowicz | ................ | 210/416.1 |
| 5,759,399 A * | 6/1998 | Bilanin et al. | ................ | 210/416.1 |
| 5,797,421 A * | 8/1998 | Merrett | .................... | 137/236.1 |
| 5,820,751 A * | 10/1998 | Faircloth, Jr. | ................. | 210/122 |
| 5,851,385 A * | 12/1998 | Merrett | .................. | 210/170.09 |
| 5,922,197 A * | 7/1999 | Sparks | ................ | 210/232 |
| 5,958,234 A * | 9/1999 | Dwyer et al. | ................ | 210/315 |
| 6,036,850 A * | 3/2000 | Reynolds | ..................... | 210/117 |
| 6,042,733 A * | 3/2000 | Tucker | ..................... | 210/747.5 |
| 6,051,131 A * | 4/2000 | Maxson | .................... | 210/162 |
| 6,089,790 A * | 7/2000 | Berry et al. | ................... | 405/127 |
| 6,126,016 A * | 10/2000 | Graham | ................. | 209/385 |
| 6,386,049 B1 * | 5/2002 | Schrumm | .................. | 73/861.66 |
| 6,401,829 B1 * | 6/2002 | Newton | ....................... | 169/24 |
| 6,440,303 B2 * | 8/2002 | Spriegel | .................... | 210/232 |
| 6,451,204 B1 * | 9/2002 | Anderson | ..................... | 210/162 |
| 6,488,846 B1 * | 12/2002 | Marangi | ..................... | 210/232 |
| 6,491,818 B2 * | 12/2002 | Dwyer et al. | ................. | 210/315 |
| 6,551,507 B2 * | 4/2003 | Gosling | ....................... | 210/232 |
| 6,638,435 B2 * | 10/2003 | Loreno | ........................ | 210/767 |
| 6,660,170 B2 * | 12/2003 | Dreyer et al. | .............. | 210/747.6 |
| 6,682,651 B1 * | 1/2004 | Toland et al. | ................. | 210/155 |
| 6,712,959 B2 * | 3/2004 | Ekholm et al. | ................. | 210/162 |
| 6,764,596 B2 * | 7/2004 | Tucker | ........................ | 210/162 |
| 6,949,198 B2 * | 9/2005 | Reber | ........................ | 210/747.5 |
| 6,953,528 B2 * | 10/2005 | Nesfield | ..................... | 210/747.5 |
| 6,955,759 B2 * | 10/2005 | Patrick et al. | ................ | 210/162 |
| 7,025,878 B2 * | 4/2006 | Spriegel | ..................... | 210/232 |
| 7,201,842 B2 * | 4/2007 | Kiefer | ......................... | 210/162 |
| 7,222,638 B1 * | 5/2007 | Wong et al. | ................... | 137/578 |
| 7,273,545 B1 * | 9/2007 | Lloyd | ......................... | 210/162 |
| 7,347,933 B2 * | 3/2008 | Berry et al. | ................... | 210/158 |
| 7,430,929 B1 * | 10/2008 | Vroblesky | .................. | 73/863.23 |
| 7,501,058 B1 * | 3/2009 | Lawrence, Sr. | ................ | 210/232 |
| 7,575,677 B1 * | 8/2009 | Barnes | ........................ | 210/232 |
| 7,682,104 B2 * | 3/2010 | Wassman et al. | .............. | 405/125 |
| 7,776,222 B2 * | 8/2010 | Glessner et al. | ............ | 210/747.5 |
| 7,794,589 B2 * | 9/2010 | Kozey | ........................ | 210/122 |
| 7,850,857 B2 * | 12/2010 | Tucker | ........................ | 210/747.5 |
| 7,867,395 B2 * | 1/2011 | Ekholm et al. | ........... | 210/333.01 |
| 7,950,527 B2 * | 5/2011 | Osborne et al. | ................ | 210/483 |
| 8,075,700 B2 * | 12/2011 | Ekholm et al. | ............. | 134/22.12 |
| 8,083,939 B2 * | 12/2011 | Dowsett | ...................... | 210/232 |
| 8,192,622 B2 * | 6/2012 | Kozey | ........................ | 210/232 |
| 2003/0029780 A1 * | 2/2003 | Ekholm et al. | ................. | 210/162 |
| 2004/0164031 A1 * | 8/2004 | Reber | ......................... | 210/767 |
| 2004/0200766 A1 * | 10/2004 | Patrick et al. | ................. | 210/153 |
| 2007/0017549 A1 * | 1/2007 | Ekholm et al. | ................... | 134/10 |
| 2007/0175834 A1 * | 8/2007 | Osborne et al. | ............... | 210/767 |
| 2007/0267340 A1 * | 11/2007 | Bleigh et al. | .................. | 210/486 |
| 2008/0061010 A1 * | 3/2008 | Tom | ............................... | 210/767 |
| 2008/0230460 A1 * | 9/2008 | Dowsett | ...................... | 210/230 |
| 2008/0295758 A1 * | 12/2008 | Glessner et al. | ............. | 114/125 |
| 2011/0056526 A1 * | 3/2011 | Ekholm et al. | ................... | 134/37 |
| 2011/0240543 A1 * | 10/2011 | Kozey | ........................ | 210/232 |
| 2011/0290743 A1 * | 12/2011 | Osborne et al. | ............... | 210/767 |
| 2012/0018369 A1 * | 1/2012 | Markgraf | ..................... | 210/435 |
| 2012/0125828 A1 * | 5/2012 | Watson | ......................... | 210/162 |

OTHER PUBLICATIONS

Johnson Screens, Brochure, "High Capacity Intake Screens," copyright 2010.

Jones & Stokes Assoc., "Evaluation Plan: USBR Flat Plate Screen at Coleman National Fish Hatchery Intake No. 3," dated Mar. 1999, pp. 5-8.

* cited by examiner

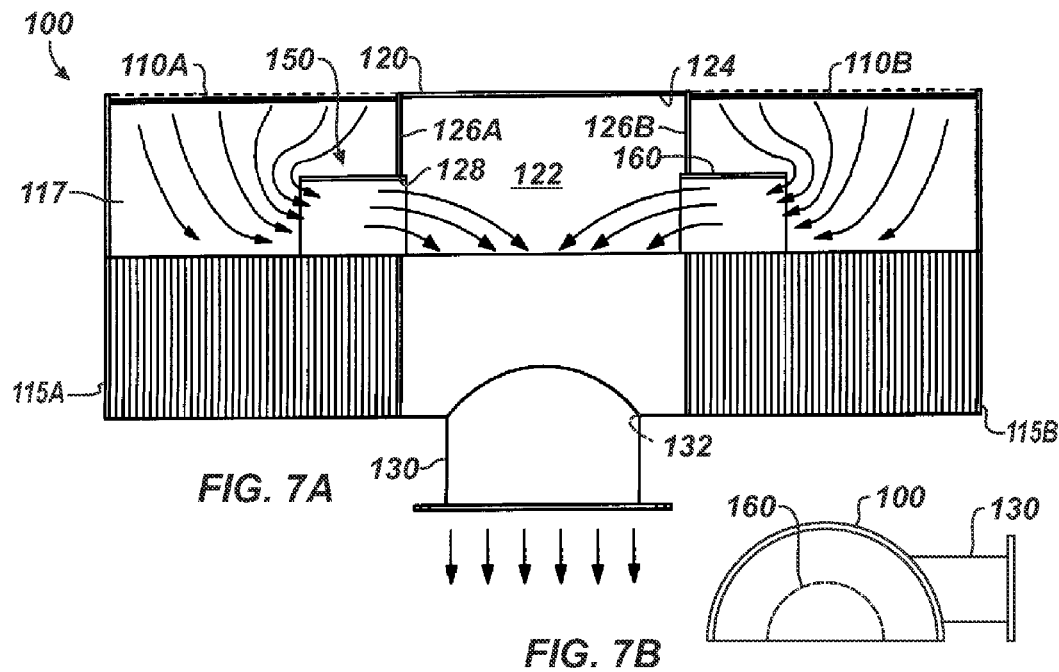
FIG. 7A
FIG. 7B
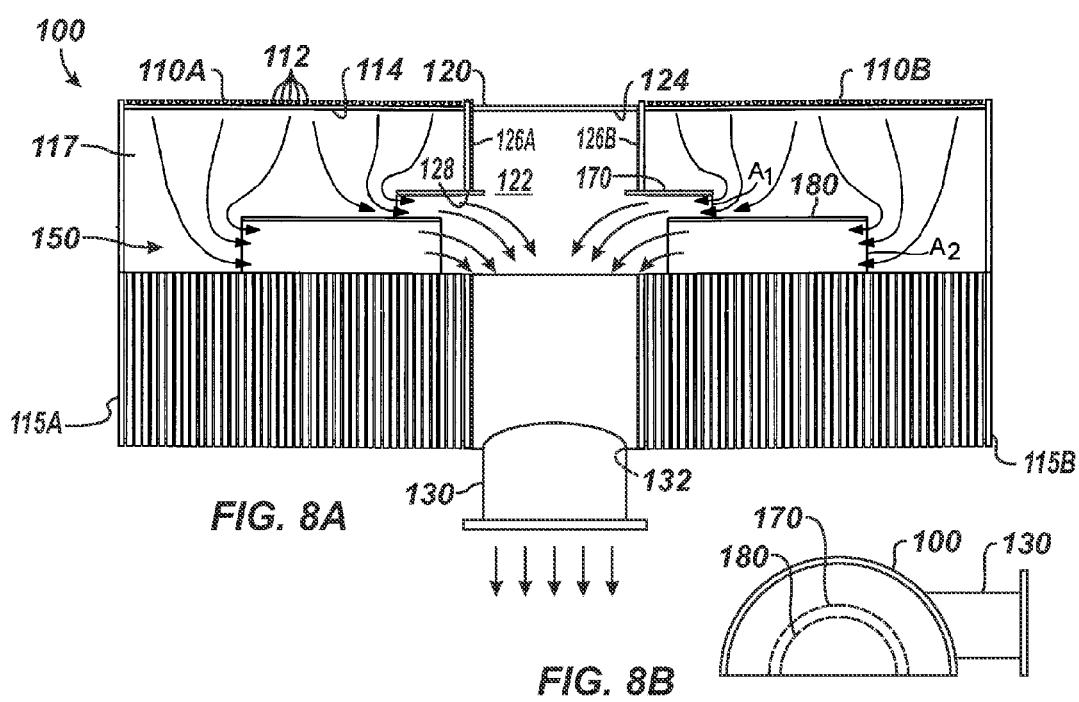
FIG. 8A
FIG. 8B

SCREEN INTAKE DEVICE FOR SHALLOW WATER

BACKGROUND

Drinking water plants, manufacturing plants, irrigation systems, and power generation facilities use large quantities of water for their operation. To collect the water, screen intakes are used in various bodies of water. As shown in FIG. 1A, one common type of screen intake 10 has a tee configuration with two screens 12A-B on opposing ends of a central body 14. An outlet 16 connects from the central body 14 for connecting to components of a screen intake system.

The screen intake 10 must be designed to protect aquatic life and to prevent buildup of debris along the length of the intake's screens 12A-B. To do this, the flow velocity through the screens should be kept below a maximum peak level, which may be about 0.5 f/s. One way to reduce the flow resistance and control the flow velocity evenly across the screen's surface is to use flow modifiers inside the screen intake. For example, Johnson Screens—the assignee of the present disclosure—improves flow uniformity using flow modifiers as disclosed in U.S. Pat. Nos. 6,051,131 and 6,712,959, which are incorporated herein by reference in their entireties.

When used in a source waterway, the screen intakes 10 must be arranged with no less than a minimum amount of distance surrounding it. As shown in FIG. 1B, the standard intake 10 requires clearance above and below the screen intake 10 that is at least half of the intake's diameter. For example, a screen intake 10 having a 24-in. diameter needs 12-in. clearance above and below the intake 10 for proper operation. Thus, the 24-in. diameter screen intake 10 can mount in water with a total minimum depth of 48-in. (4-ft.).

Available source waters for intake systems are becoming shallower. For shallow applications, flat screens, velocity caps, or cribbing has been used in the past to intake source water. These traditional approaches sit flat on the bottom of the source water. Being flat, however, these types of screens can have problems with deflection and strength when subjected to flow and debris. In addition, these types of screens can be difficult to keep clear of debris. Finally, flat screens can have uneven flow distribution over the screen's surface area, which can be problematic during operation.

The subject matter of the present disclosure is directed to overcoming, or at least reducing the effects of, one or more of the problems set forth above.

SUMMARY

A screen intake apparatus has a base that disposes on a floor of a water source. The base can be a concrete slab or platform resting on the floor and having a top surface. A screen intake disposes on the base and forms a half cylinder thereon. Anchors can affix edges of the screen intake to the top surface of the base. In a river or application with strong currents, the base would preferably have a barrier disposed at one end thereof in a path of flow of the source water to deflect debris and silt from the screen intake.

The screen intake has a body with first and second screens on its ends. Each of the screens forms a half cylinder on the base and defines an interior therein. The interiors communicate with the hollow of the body so the source water entering the screen passes to the body and out a common outlet.

The first and second screens each have a screen sidewall, a closed distal end, and an open proximal end. The open proximal end attaches to the body, while the closed distal ends have end walls that define a half circle. Preferably, the screen intake has transition walls disposed between the hollow of the body and the interiors of the screens. At least one flow modifier disposes in each of the transition walls. The flow modifier has one open end communicating with the interior of the screen and has another open end communicating with the hollow of the body. The flow modifier can have two or more flow modifiers nested inside one another, and these flow modifiers also form a half cylinder with the base.

The screen intake can also have a manifold disposed in the screens for receiving a supply of air used to clear the screens of debris. Construction of the screens can use ribs disposed along a length of the screen and can have wires disposed across the ribs. Overall, the half cylinder screen intake mounted on the top surface of the base can provide all the attributes of a normal intake screen but provide a very low profile for shallower applications.

The foregoing summary is not intended to summarize each potential embodiment or every aspect of the present disclosure.

BRIEF DESCRIPTION OF THE DRAWINGS

FIGS. 7A-7B show plan and end views of a screen intake with a first type of flow modifier.

FIGS. 8A-8B show plan and end views of a screen intake with a second type of flow modifier.

DETAILED DESCRIPTION

Figure 1A:
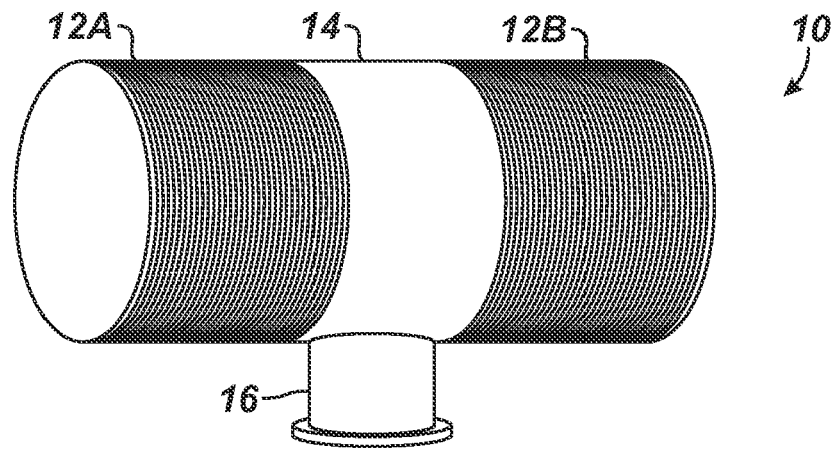
FIG. 1A is a perspective view of a screen intake according to the prior art.
Figure 1B:
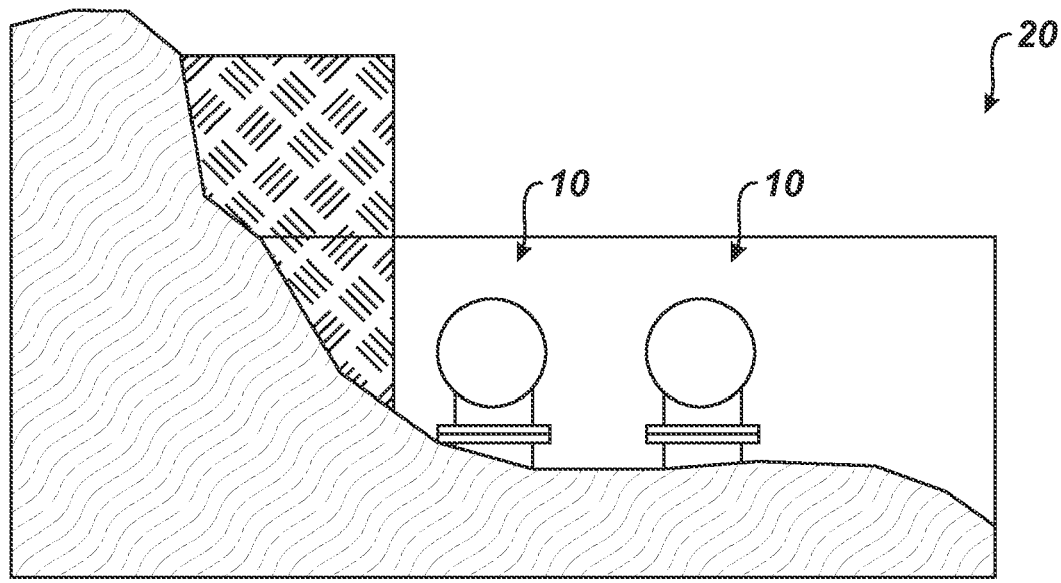
FIG. 1B is a view of a prior art screen intake system used in a shallow water source, such as a river.
Figure 2:
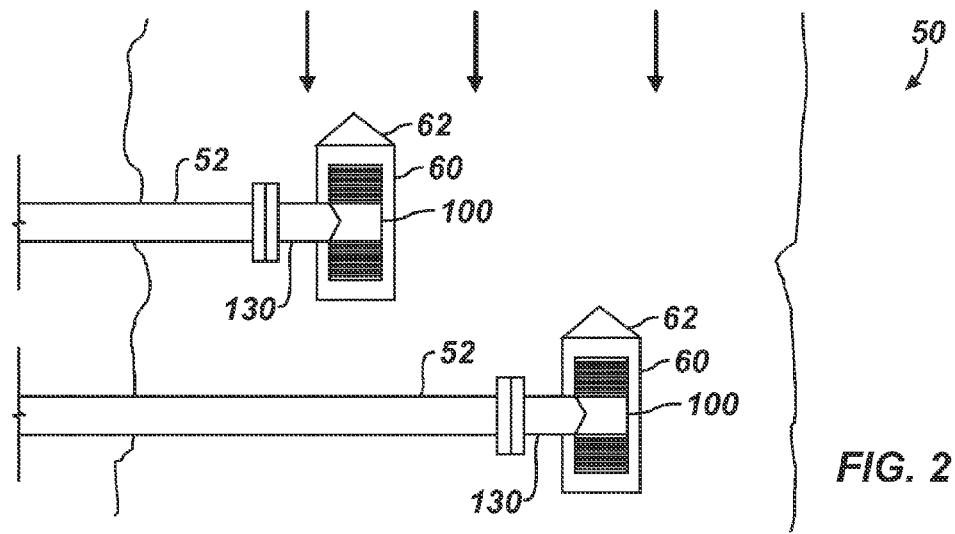
FIG. 2 is a plan view of a screen intake system according to the present disclosure.
Figure 3A:
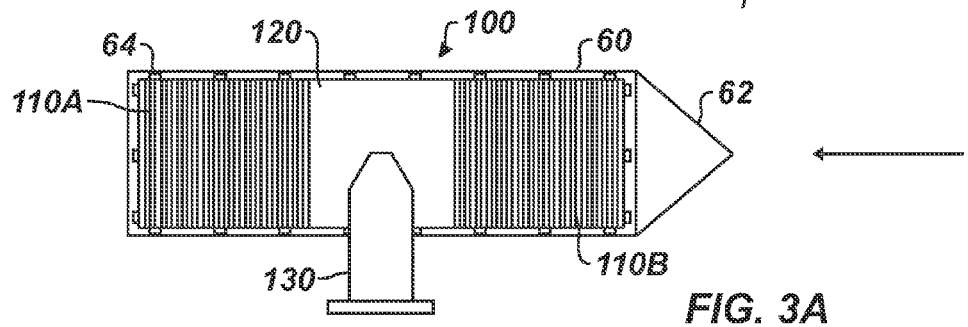
FIGS. 3A-3C show plan, side, and end views of a screen intake on a platform for the disclosed intake system.
Figure 3B:
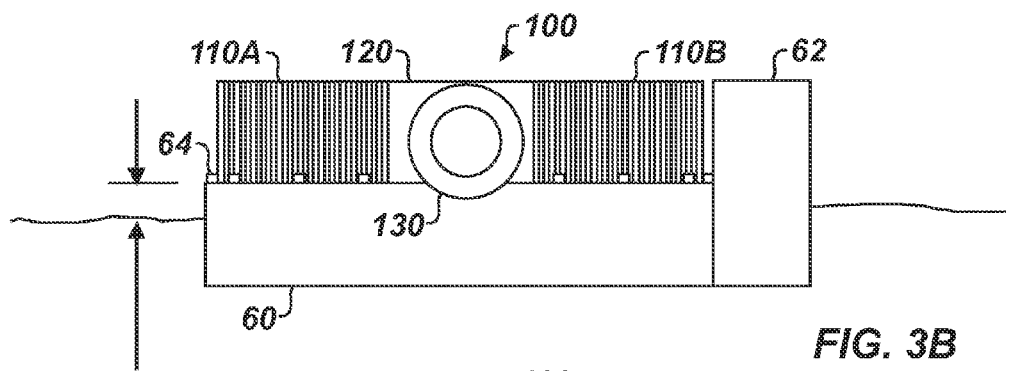

A screen intake system 50 in FIG. 2 has two screen intakes 100, although more or less could be used. Each screen intake 100 positions on a base or platform 60 disposed in the flow of a water source, such as a river. FIGS. 3A and 3B show top and side views of the platform 60. The platform 60 can be composed of a concrete slab or the like and can rest on the floor of the water source. As shown in FIG. 3B, the platform 60 preferably extends at least 3-4 inches above the floor of the water source.

In a river or other application where a current is present, the front end of each platform 60 has a profiled barrier 62 to cut the water flow ahead of the screen intake 100. The profiled barrier 62 is preferably angled at its front face and divides the passage of water, debris, and silt. In addition as shown in FIG. 3B, the profiled barrier 62 preferably extends to about the height of the screen intake 100 resting on the platform 60. The barrier 62 can be separately constructed from the platform 60 or can be integrally formed therewith. As an alternative to the barrier 62, the screen intake 100 can be provided with a profiled end.

As shown in FIG. 3A, the screen intake 100 can have a tee configuration with first and second screen sections 110A-B connected on opposing ends of a central body 120. End walls 115A-B close off the ends of the screen sections 110A-B, and a central outlet 130 extends from the central body 120. Alternatively, the screen intake 100 can have one screen section 110 connected to a body 120 with an outlet 130, while the other end of the body 120 is closed and lacks a second screen section 110.

Figure 3C:
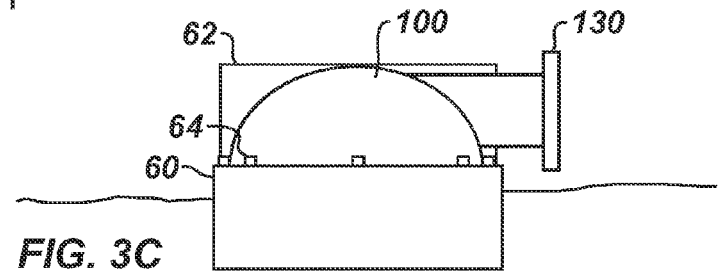

As shown in FIG. 3C, the screen intake 100 defines a half cylinder on the top surface of the platform 60. In general, the screen intake 100 has half-cylinder screens for the screen sections 110A-B along with half circle end walls 115A-B. The body 120 can have a half-cylinder sidewall, although another configuration could be used. Each of these components (110, 115, 120) can be affixed together using techniques known in the art. In one arrangement, the screen intake 100 has a flat bottom component that affixes to the edges of these interconnected components (110, 115, 120). Such a flat bottom can rest against the top surface of the platform 60, while anchor bolts 64 or the like are used to affix the screen intake 100 to the platform 60.

Alternatively, the intake 100 may lack an overall flat bottom component that affixes to the edges of the connected components (110, 115, 120). Instead, free edges of the interconnected body 120, screen sections 110A-B, and end walls 115A-B can fit directly against the platform 60 and can attach thereto using the anchor bolts 64 or the like. For example, the platform 60 can have a width and a length that is slightly larger than the screen intake 100 by about 3-in. or so. The platform 60 can have holes defined all around its perimeter for concrete anchor bolts 64 that hold the screen intake 100 onto the platform 60.

In yet another arrangement, the screen intake 100 can be a cylindrical (or at least partial cylindrical) screen intake partially embedded in the material of the platform 60. In this arrangement, the full or partial cylindrical screen intake 100 can be embedded in the concrete of the platform's slab when constructing the platform 60 using techniques available in the art.

In assembly, the screen intake 100 can be preconstructed on the platform 60 on land, and both components 60/100 can be sunk to the floor of the water source. Alternatively, the screen intake 100 and platform 60 can be separately constructed. The platform 60 can be placed on the water source's floor, and the screen intake 100 can be affixed to the top surface of the platform 60 with the anchors 64. These and other forms of construction can be used for the screen intake system 50.

As shown in FIG. 2, the outlets 130 of the screen intakes 100 connect by piping 52 to a facility (not shown) configured to use the intake water. Preferably, the intakes 100 and platforms 60 are staggered in relation to one another so as not to lie in each other's wakes. The screen intake 100 mounted toward the bottom of the source water reduces the depth needed to take in the same flow as a conventional screen. For example, the screen intake 100 can define a 24-in. diameter (12-in. radius). This requires a 12-in. clearance above the screen intake 100 for proper operation.

Figure 4A:
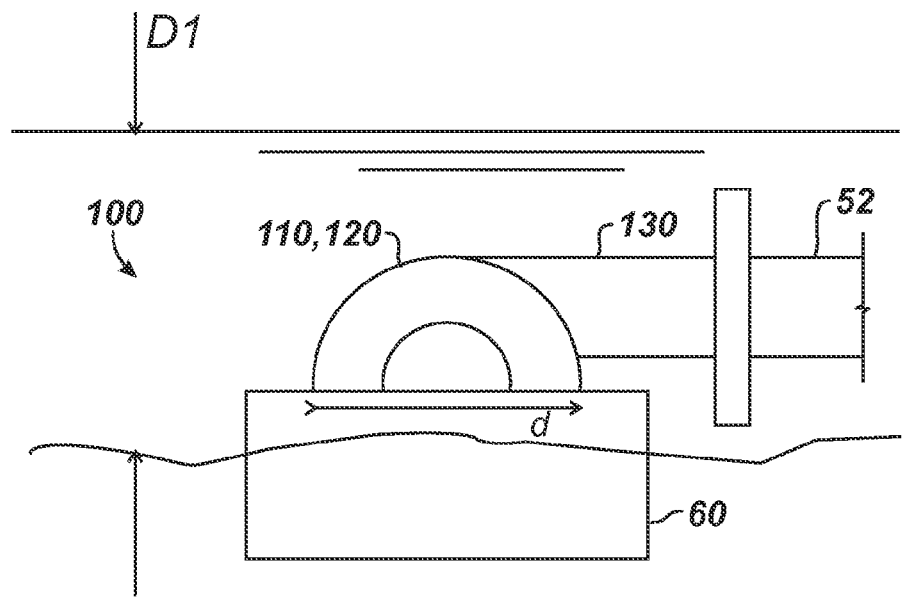
FIGS. 4A-4B show a 24-inch tee screen intake of the prior art compared to a 24-inch half-screen intake according to the present disclosure.
Figure 4B:
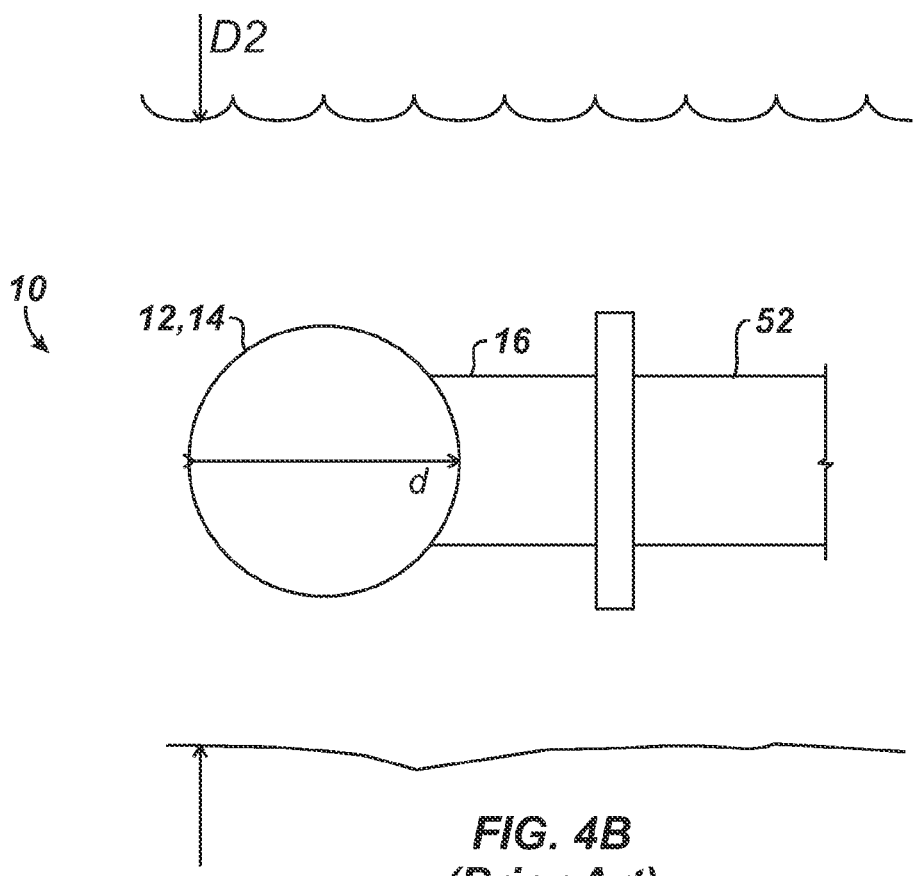

As shown in FIG. 4A, for example, the screen intake 100 of the present disclosure with a 24-in. diameter d can operate in a total minimum operational depth D1 of only about 20-in. This offers advantages over conventional systems using a 24-in. diameter tee screen 10 of the prior art as shown for comparison in FIG. 4B. Such a conventional tee screen 10 of the prior art needs a 48-in depth D2 of water.

As shown in FIGS. 3A-3B, each of the screen sections 110A-B defines a plurality of slots for entry of water into the screen sections 110A-B. The slots can be either transverse or parallel to the axis of the screen sections 110A-B. Preferably, spaced wraps of profiled wire form the slots of the screen sections 110A-B, although the screen sections 110A-B can also be a solid pipe member with slots formed therein. The screen sections 110A-B can keep flow distribution even over the screen's surface area. The curved, rounded screen sections 110A-B also provide strength to the screen intake 100 while offering a low profile. Thus, the curved screen sections 110A-B may not need additional structural support in their interiors to support the screen surfaces.

Figure 5:
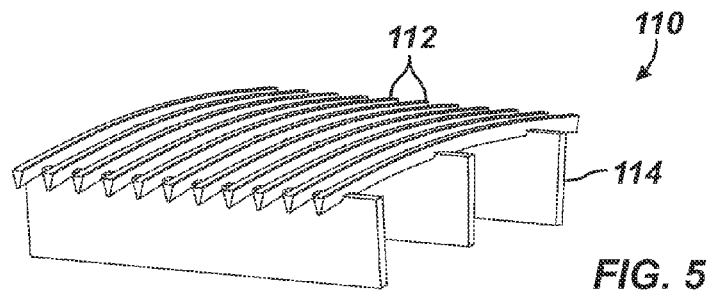
FIG. 5 shows a portion of a screen section for the screen intake of the present disclosure.

As shown in FIG. 5, one form of construction for the screen sections 110 has profiled wires 112 and support bars 114. In one implementation, the support bars 114 run along the length of the screen section 100, and the profiled wires 112 circumferentially wrap and weld to the support bars 114 to form the screen section 110 using techniques known in the art. The profiled wires 112 are preferably wedged or Vee-shaped with a wider base of the wire 112 facing outward to enhance the sliding of debris over the screens' surfaces. For example, the profiled wire 112 can be VEE-WIRE® available from Johnson Screens. (VEE-WIRE is a registered trademark of Weatherford/Lamb, Inc.).

Figure 6A:
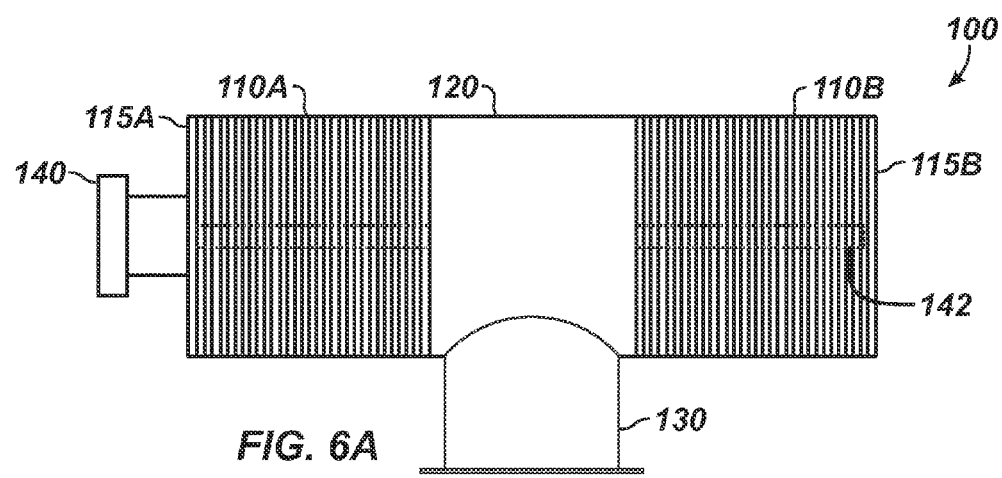
FIGS. 6A-6C show plan and end views of one type of screen intake for the disclosed system.
Figure 6B:
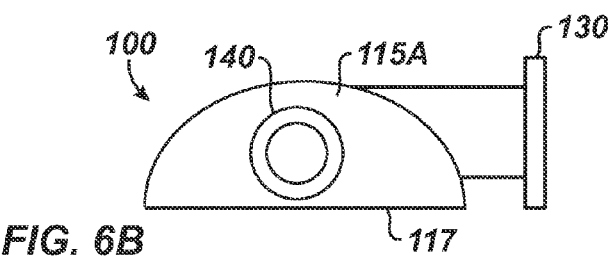
Figure 6C:
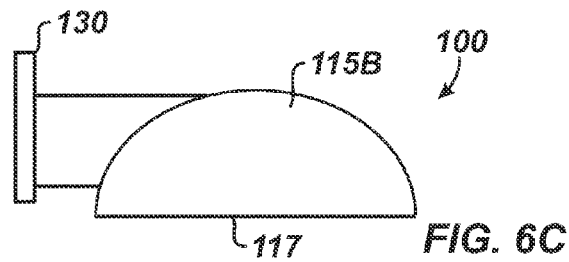

Another example of a screen intake 100 is shown in FIGS. 6A-6C. This intake 100 has the screen sections 110A-B, end walls 115A-B, central body 120, and outlet 130 as before. The intake 100 also defines a half cylinder as shown in FIG. 6B-6C. The screen intake 100 can have a closed or open bottom 117 as discussed previously for resting on the top surface of a platform.

In addition to these features, the screen intake 100 has an air backwash pipe 140 and a header 142 provided for backwashing the screen intake 100 with an air burst to clear debris. The air backwash header 142 connects to the air backwash pipe 140 and disposes inside the screen sections 110A-B and the body 120. When used, the pipe 140 and header 142 allow the screen intake 100 to be backwashed with an airburst to clear debris. These features can be based on Johnson Screen's Hydroburst System. In general, the Hydroburst system uses a compressor, a tank, valves, and controls to generate a blast of air in the screen sections 110A-B. Done periodically, the air blast flushes debris away from the screen's surfaces.

In addition to the backwash system, the intake 100 of the present disclosure can include flow modifiers disposed internally in the screen sections 110A-B. The flow modifiers can be used with the backwash system or alone. Further details of the flow modifiers are provided below with reference to FIGS. 7A-7B and 8A-8B.

The screen intake 100 illustrated in FIGS. 7A-7B and 8A-8B each has a tee configuration with first and second screens 110A-B connected on opposing ends of the central body 120. The central body 120 defines a hollow 122 therein and has a half-cylindrical sidewall 124 and opposing transition walls 126A-B. The outlet conduit 130 connects to an opening 132 in the sidewall 124 and has a flange for connecting to other components of a fluid intake system (not shown). Both transition walls 126A-B have a central opening 128 receiving flow from one of the screen sections 110A-B.

Both screen sections 110A-B have open ends connected to the body's transition walls 126A-B and have closed ends walls 115A-B that may or may not be shaped to deflect debris. Each of the screen sections 110A-B defines a half cylinder and defines a plurality of slots for entry of water into the screen sections 110A-B as described previously. Again, the slots can be either transverse or parallel to the axis of the screen section 110A-B. Preferably, spaced wraps of profiled wire 112 form the slots of the screens 110A-B, although the screens 110A-B can also be a solid pipe member with slots formed therein.

The central passages 128 in the transition walls 126A-B may be sufficient to control the flow velocity at the screen's surfaces to maintain a preferred surface flow velocity. However, each transition wall 126A-B preferably has a flow modifier 150 disposed in its central opening 128 to further control the flow velocity. In general, the screen intake 100 can use flow modifiers 150 having one or more pipes disposed in the openings 128 and partially inside the hollows of the screen sections 110A-B to communicate fluid from inside the screen sections 110A-B, through the openings 128, and into the hollow 122 of the central body 120.

The screen intake 100 embodied in FIGS. 7A-7B uses single flow pipes 160 for the flow modifier 150 disposed in the openings 128. The screen intake 100 embodied in FIGS. 8A-8B uses double flow pipes 170 and 180 nested inside one another in the openings 128. In both arrangements, the pipes 160 and 170/180 of the flow modifiers 150 can actually be half cylinders with open or closed bottom surfaces, although full cylindrical pipes can be used off center in openings 128 of the transition walls 126A-B.

The screen intake 100 and flow modifiers 150 of FIGS. 7A-7B and 8A-8B are designed to reduce the entrance velocity at the screens' slots to a preferred peak, which may be about 0.135 m/s or 0.5 f/s in some implementations. A lower entrance velocity protects surrounding aquatic life and prevents debris clogging. Designers configure the lengths, diameters, flow areas, and other variables of the flow modifiers' pipes 160 and 170/180 to keep the average flow through the screens' surfaces as close to the allowable peak flow velocity and as uniformly distributed across the screens' surfaces as possible. Where the flow modifier uses two pipes 170/180 as in FIG. 8A, for example, the larger diameter pipe 170 may be about 50% of the screen section 110's diameter and may be about 16% of the length of the screen 110. The smaller diameter pipe 180 nested within the outer pipe 170 may have a diameter about 70% that of the outer pipe 170 and may have a length which extends about 67% of the length of the screen 110. Further details related to the design of the flow modifiers 150 are disclosed in U.S. Pat. No. 6,051,131, which is incorporated herein in its entirety.

As used herein and in the claims, terms such as cylinder and cylindrical are meant to be generic and refer to a general geometric shape known by that name. Terms such as half cylinder and half-cylindrical refer to a division of such a general geometric shape along a longitudinal axis and need not be precisely half. Thus, the sidewall of the cylinder and half cylinder as used herein can be defined by a radius as in the standard geometric shape. However, the sidewall of the cylinder and half cylinder as used herein can be defined by multiple angled surfaces, a cycloidal surface, an elliptical surface, an oval surface, a parabolic surface, or any other curved surface. The foregoing description of preferred and other embodiments is not intended to limit or restrict the scope or applicability of the inventive concepts conceived of by the Applicants. In exchange for disclosing the inventive concepts contained herein, the Applicants desire all patent rights afforded by the appended claims. Therefore, it is intended that the appended claims include all modifications and alterations to the full extent that they come within the scope of the following claims or the equivalents thereof.

What is claimed is:

1. A screen intake apparatus, comprising:
   a solid base having a top surface and being disposed in a water source;
   a body mounted on the top surface of the base, the body having first and second ends and defining a hollow therein, the body having an outlet in communication with the hollow;
   a first half cylinder screen disposed on the first end of the body, sealingly mounted on the top surface of the base, and defining a first interior;
   at least one first flow modifier disposed between the first screen and the body and placing the first interior in fluid communication with the hollow;
   a second half cylinder screen disposed on the second end of the body, sealingly mounted on the top surface of the base, and defining a second interior; and
   at least one second flow modifier disposed between the second screen and the body and placing the second interior in fluid communication with the hollow.

2. The apparatus of claim 1, wherein the first or second screen comprises a screen sidewall, a closed distal end, and an open proximal end, the open proximal end attached to the body.

3. The apparatus of claim 2, wherein the closed distal end comprises an end wall defining a half circle.

4. The apparatus of claim 1, wherein the at least one first or second flow modifier comprises:
   a transition wall disposed between the hollow of the body and the first or second interior of the first or second screen; and
   at least one flow passage disposed in the transition wall and placing the first or second interior in fluid communication with the hollow.

5. The apparatus of claim 4, wherein the at least one flow passage comprises at least one flow tube extending from the transition wall into the first or second interior.

6. The apparatus of claim 5, wherein the at least one flow tube comprises at least two flow tube nested inside one another.

7. The apparatus of claim 6, wherein the solid base comprises a concrete slab resting on a floor of the water source.

8. The apparatus of claim 1, wherein a plurality of anchors affix edges of the body and the first and second screens to the top surface.

9. The apparatus of claim 1, wherein the base comprises a barrier disposed at one end thereof in a flow path of the water source.

10. The apparatus of claim 9, wherein the barrier extends to a height of the body disposed on the solid base.

11. The apparatus of claim 1, further comprising a manifold disposed in the first or second screen for receiving a supply of air.

12. The apparatus of claim 1, wherein the first or second screen comprises:
   a plurality of ribs disposed along a length of the first or second screen; and
   a plurality of wires disposed across the ribs.

13. The apparatus of claim 1, wherein the body defines a half cylinder on the top surface of the solid base.

14. The apparatus of claim 1, wherein the first or second half cylinder screen comprises an at least partially cylindrical screen embedded in material of the solid base to form the half cylindrical screen.

* * * * *